United States Patent [19]
Wyslotsky

[11] 3,815,322
[45] June 11, 1974

[54] PACKAGING MACHINE

[76] Inventor: Ihor Wyslotsky, 914 W. 119th St., Chicago, Ill. 60643

[22] Filed: May 8, 1972

[21] Appl. No.: 251,250

[52] U.S. Cl................ 53/112 A, 53/184, 425/290, 425/388, 425/143, 425/DIG. 201
[51] Int. Cl............................................. B65b 31/00
[58] Field of Search .. 425/143, 290, 388, DIG. 201, 425/DIG. 200; 53/112 R, 112 A, 184

[56] References Cited
UNITED STATES PATENTS

| | | | |
|---|---|---|---|
| 3,218,776 | 11/1965 | Cloud | 53/30 |
| 3,244,779 | 4/1966 | Levey et al. | 425/388 X |
| 3,396,062 | 8/1968 | White | 425/388 X |
| 3,422,522 | 1/1969 | Mojonnier | 425/388 X |
| 3,464,182 | 9/1969 | Nichols | 425/DIG. 201 |
| 3,467,741 | 9/1969 | Kesling | 425/388 X |
| 3,561,057 | 2/1971 | Butzko | 425/143 X |

*Primary Examiner*—Robert L. Spicer, Jr.
*Attorney, Agent, or Firm*—Paul H. Gallagher

[57] ABSTRACT

A machine for packaging articles such as meat slices; the package is formed by opposed films one of which is vacuum formed to form cavities and the other is applied thereto to complete the package; the film that is vacuum formed is heated gradually (not on-off) and substantially uniformly throughout its thickness and in the heating step, the temperature of the film is maintained at a predetermined minimum; the packages are made first in units containing two cavities and the units are perforated at a center point and the package units are nitrogen-purged at the center aperture; the films making up the packages are registered relative to a label pattern on the cover film and the cavities in the bottom film, through tension variation, under the control of a PE cell; the machine includes conveyor means intermittently advanced, the rate of speed being variable but of dwell intervals that are of predetermined length independent of the speed during travel; final cutting means includes circular friction grippers for pulling a package unit having two packages therein, and rotary cutter elements.

15 Claims, 20 Drawing Figures

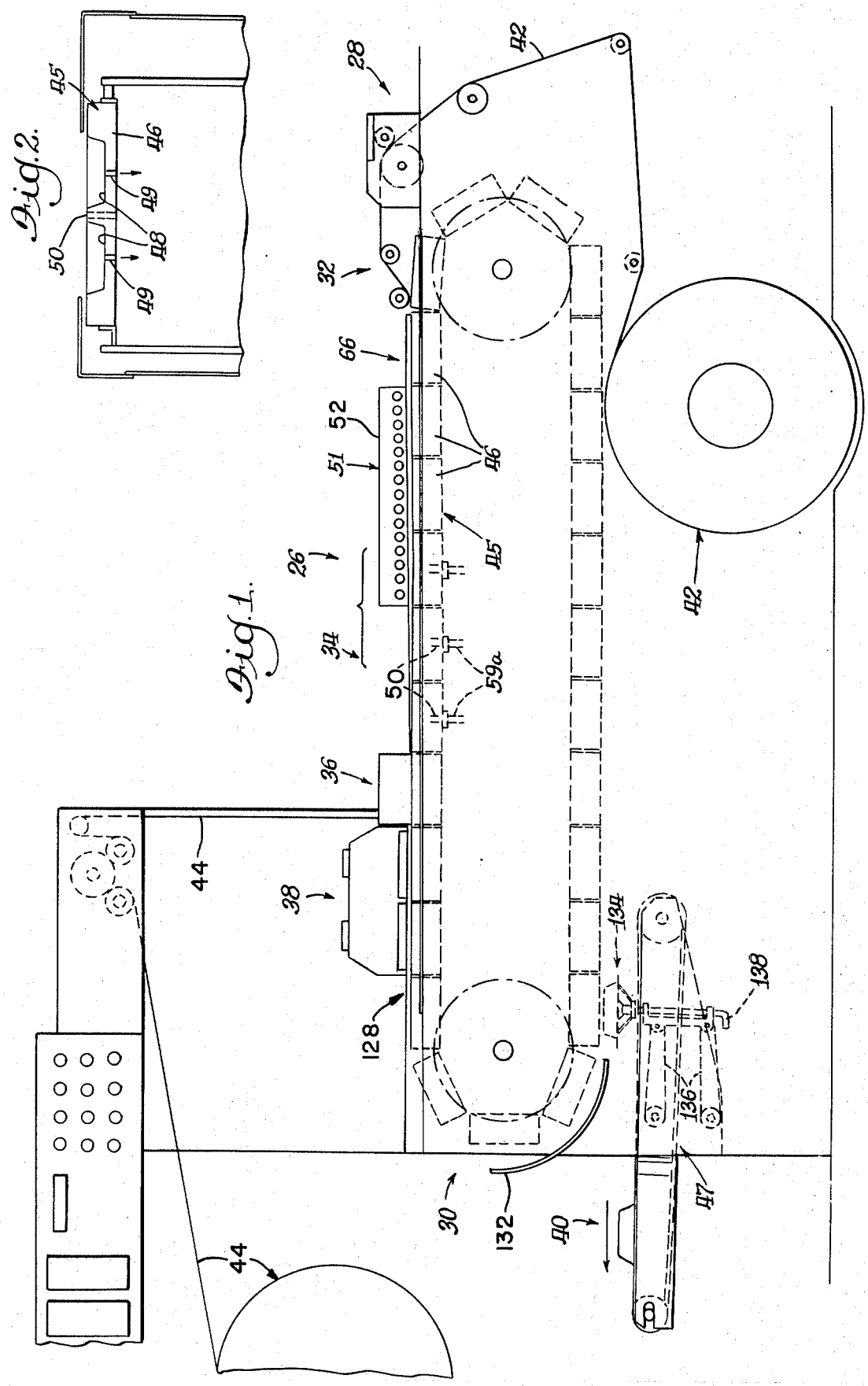

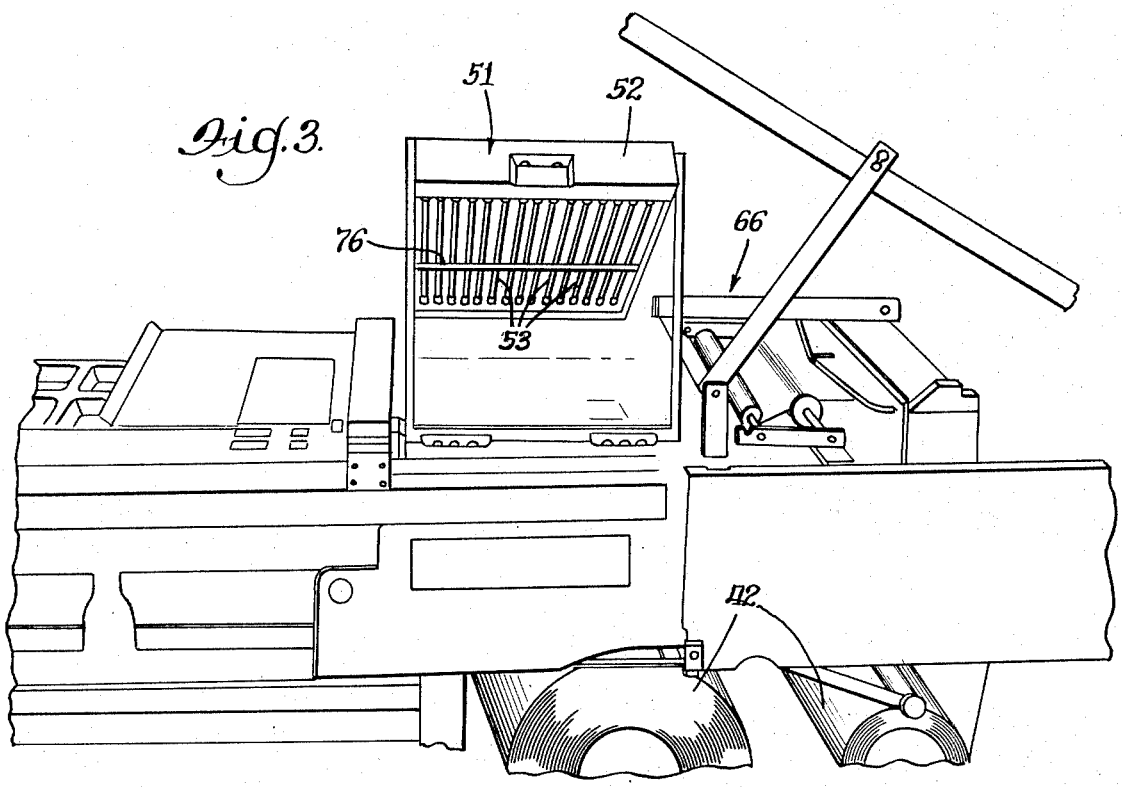
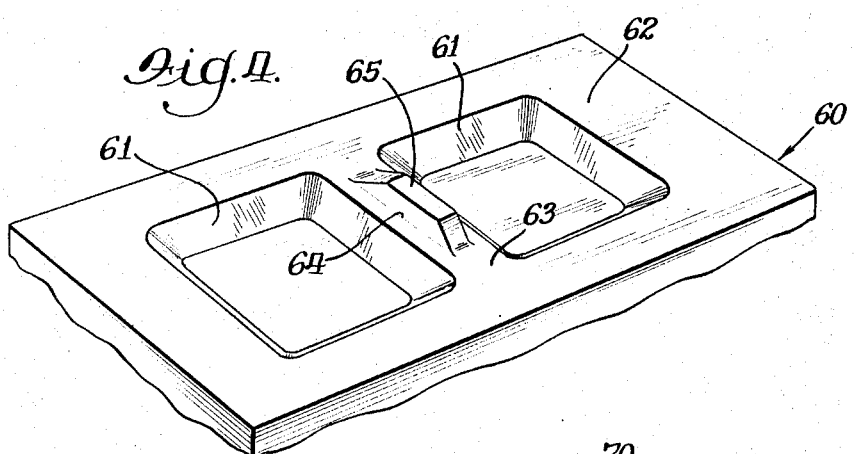
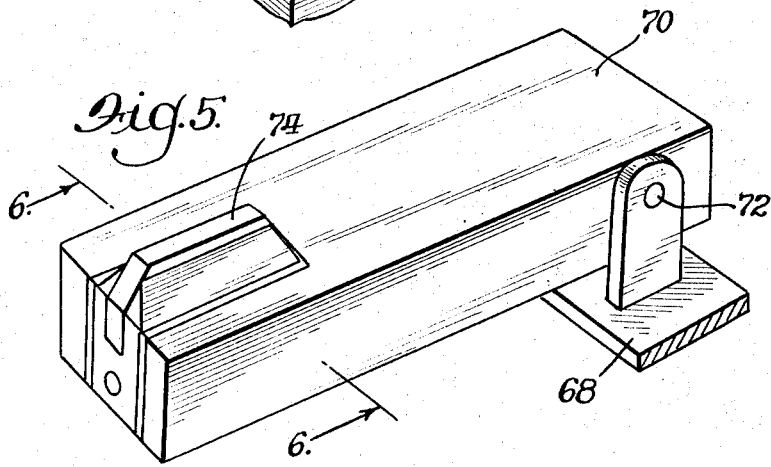
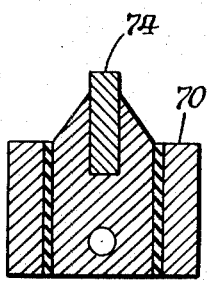

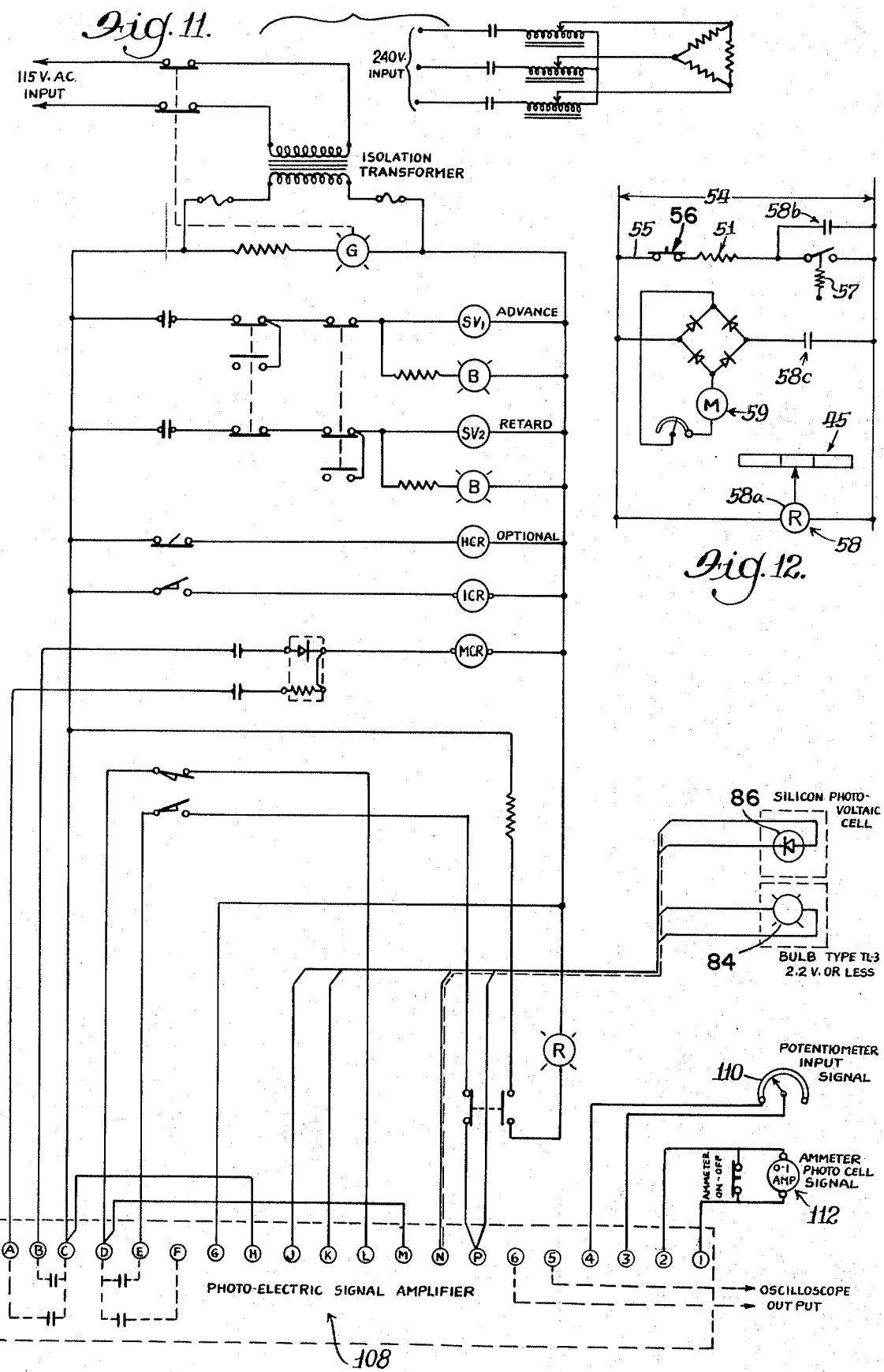

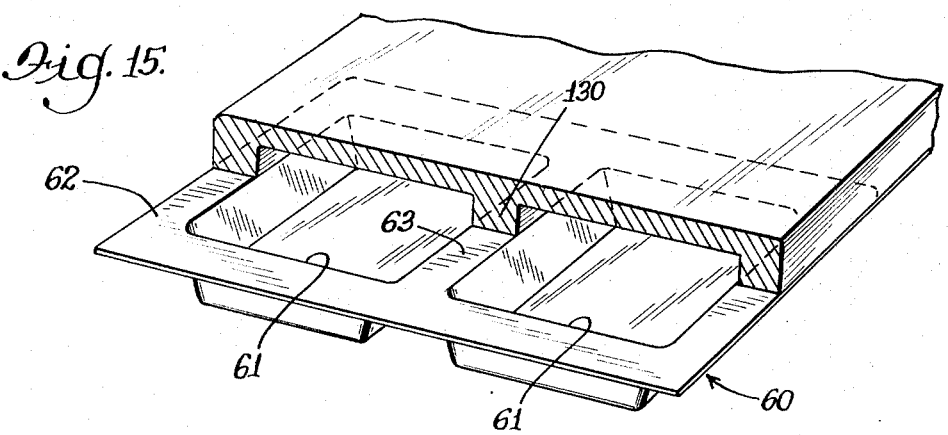
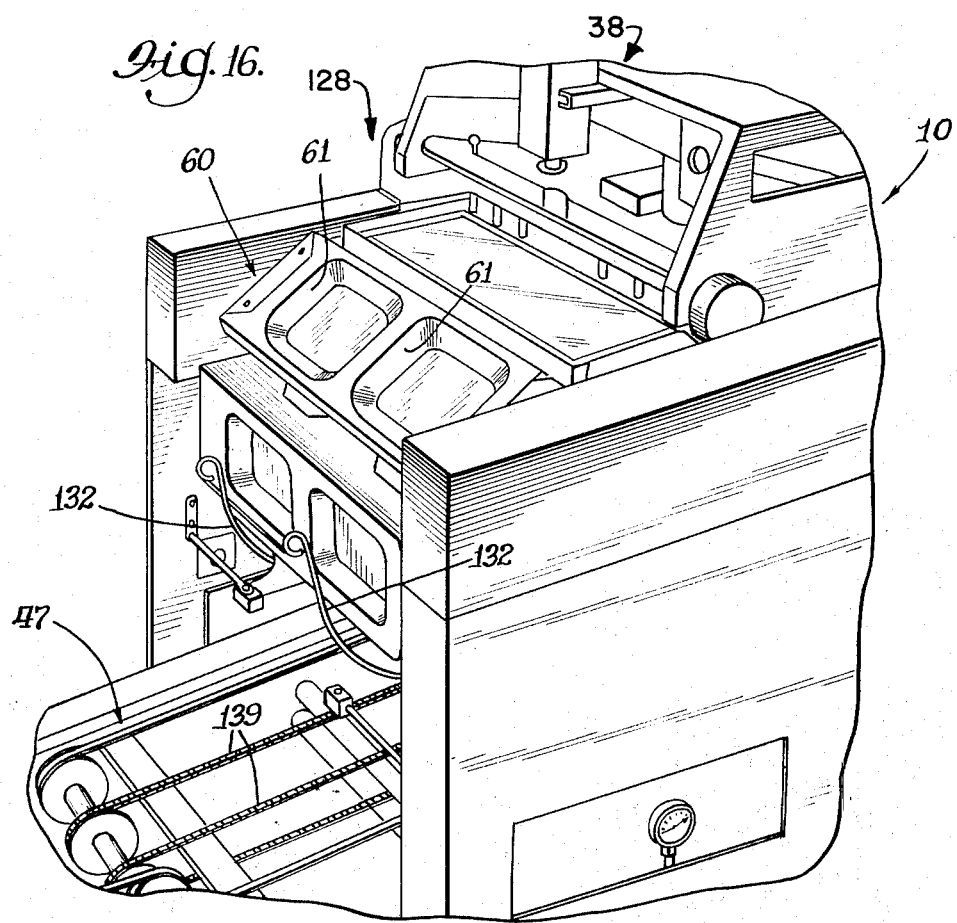

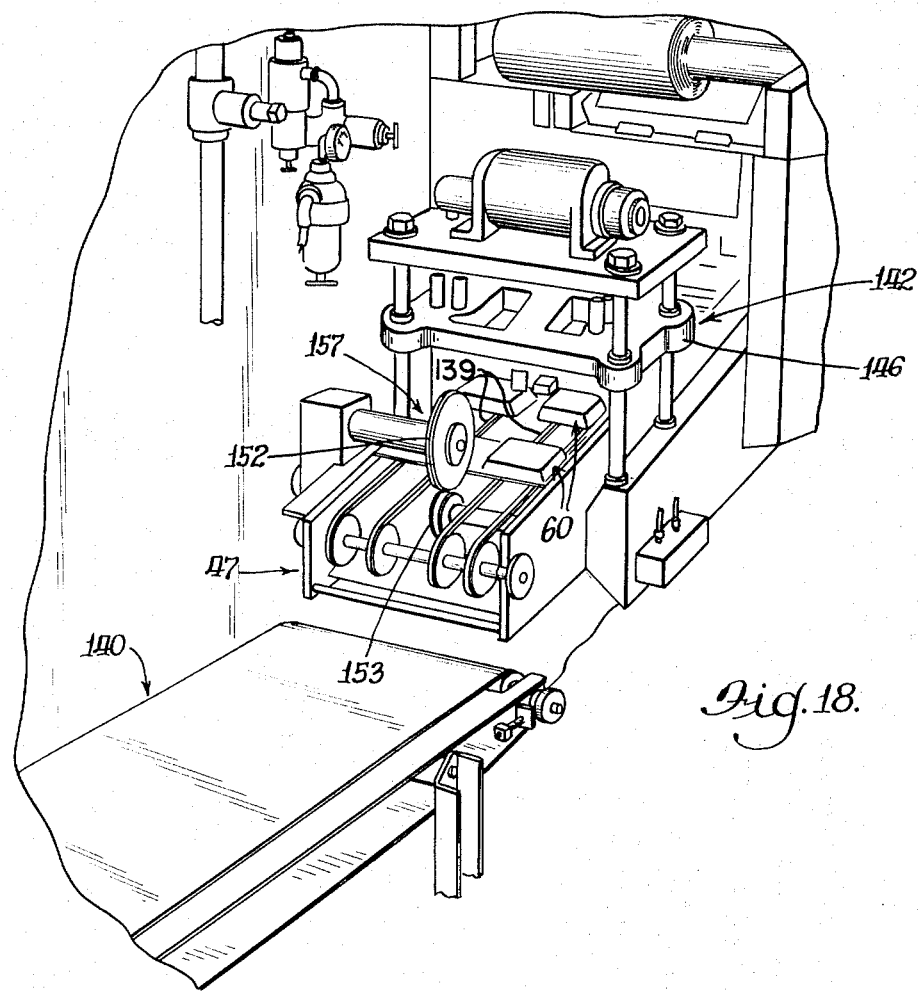

PACKAGING MACHINE

OBJECTS OF THE INVENTION

A broad object of the invention is to provide a novel packaging machine and method of packaging of the general type utilizing a pair of films, vacuum forming one of the films and applying the other film thereto and sealing the films, incorporating a novel means and method of applying heat to the bottom film which is to be formed, maintaining the bottom film, or so much of it as is to be formed, at a gradual elevated temperature, as contrasted with on-off heating, and heating the bottom film substantially uniformly throughout its thickness.

Another broad object is to provide a packaging machine and method of packaging which includes the step of forming package units, each unit including a plurality of cavities, for example two, which are later to form individual packages, and providing an aperture at a center point of the package unit, and nitrogenpurging the individual cavities and thereafter final sealing the individual cavities and cutting them apart to form the ultimate finished individual packages.

Still another object is to provide a packaging machine and method of packaging of the character just referred to, in which a center aperture in each package unit is provided, this aperture being prefromed in conjunction with heating the bottom film for vacuum forming cavities therein, and which includes cooling means limited to the immediate areas of the apertures to prevent those areas from being heated generally with the overall heating pattern, whereby to maintain an aperture strip of preformed shape to facilitate evacuating and purging the packages.

An additional object is to provide, in a nitrogenpurging operation of packages of the character referred to above, utilizing a novel valving arrangement for introducing nitrogen into the packages and withdrawing air and other gases that had previously been therein.

An additional object is to provide a packaging machine and method of packaging of the foregoing general character, utilizing opposed films, one of the films having package cavities formed therein and the other film having label patterns, and including novel means for registering the label patterns with the package cavities, utilizing novel PE cell control, in the steps of sealing the two films together to form the final packages.

Still another object is to provide a packaging machine and method of packaging, which includes forming package units each unit including a plurality of elements each to form a single final package, and including novel means for final severing the elements of the package units and thereby forming a corresponding plurality of individual packages.

A further object is to provide novel drive means for intermittently advancing the conveyor means utilized in the machine.

A still further object is to provide novel means for aligning and positioning packages on the conveyor means for registering them with operating parts of the machine such as a trim die.

DESCRIPTION OF A PREFERRED EMBODIMENT

In the drawings:

FIG. 1 is a side elevational view of the machine made according to the present invention, omitting various details;

FIG. 2 is a sectional view taken at line 2—2 of FIG. 1;

FIG. 3 is a detail view of the main film heater means shown in open and inoperative position;

FIG. 4 is a perspective view of a two-cavity tray formed from the bottom film;

FIG. 5 is a detail film view of a notcher component;

FIG. 6 is a sectional view taken at line 6—6 of FIG. 5;

FIG. 11 is a diagram of the electrical circuit controlling the registration of the films, and other elements;

FIG. 12 is a circuit diagram of the electrical controls for the film heater means, and the variable speed drive of the conveyor means;

FIG. 15 is a perspective semi-diagrammatic illustration of the elements utilized in the final sealing operation;

FIG. 16 is a detail perspective view showing certain components at the exit end of the machine;

FIG. 18 is a perspective view of additional elements at the exit end of the machine;

FIG. 19 is a detail view of stop means associated with the trim die; and

Figure 8:
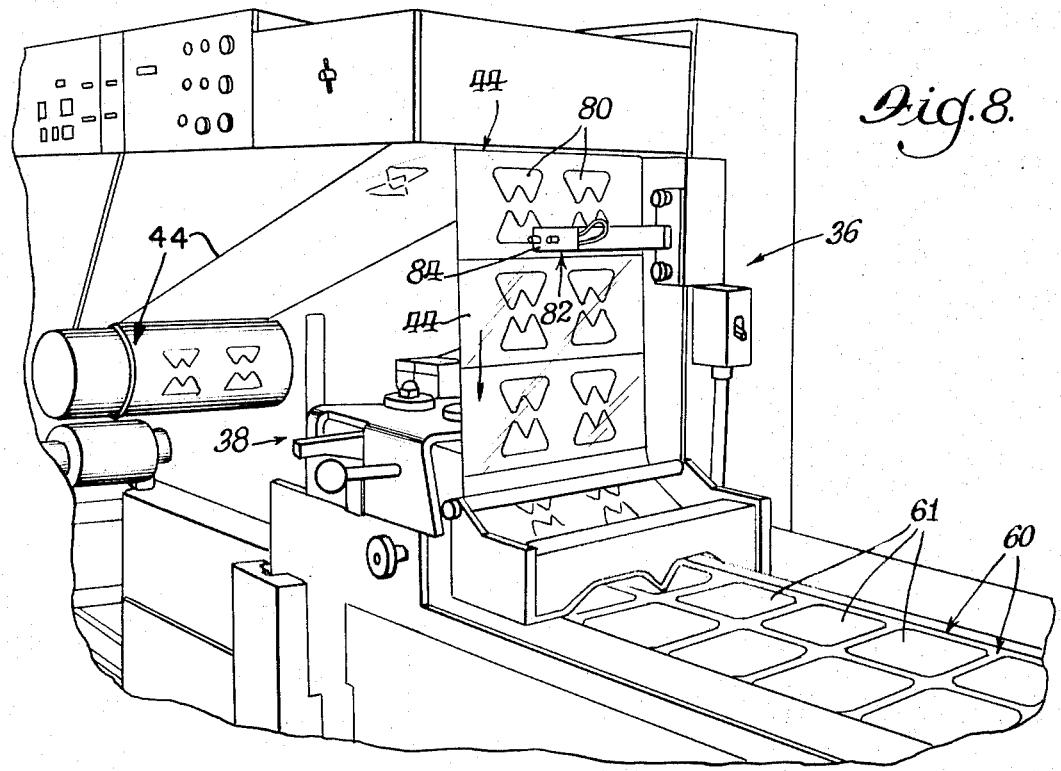
FIG. 8 is a fragmentary perspective view of the two films as they approach the station for sealing them together.

In illustrating and describing the machine and the parts thereof, as many details have been omitted as is found practicable in order to minimize the overall disclosure, and to facilitate the consideration of the principal components of the machine, since many of the details may be as desired and may even be found to be conventional. It will also be found that many of the details, both in mechanical structure and electrical circuit, will be understood without specific description.

Referring in detail to the accompanying drawings, attention is directed first to FIG. 1 which shows the overall machine in its entirety, in side view. The machine identified as a whole at 26 has an entry or lead-in end 28 and an exit or discharge end 30, and includes a first station 32 at which the bottom film or material is shaped to form trays; next is a product loading area or station 34; following that is a registration station 36 at which the lid film or material is registered with the bottom film; following that station is another station 38 at which a first sealing step is performed, the packages are evacuated and purged and the final sealing step is performed; finally another station 40 adjacent the exit end of the machine includes the final trim die step and severing individual packages and conveying them out of the machine.

A roll of film or sheet material 42 for making the bottom trays is mounted in a suitable location at the entry end of the machine while another roll of film or sheet material 44, of lidding material, is mounted adjacent the exit end. The film in both cases is in the form of a continuous sheet of plastic material, of known kind, and fed through the machine as described hereinbelow.

The machine includes a main endless conveyor 45 made up of a succession of links or trays 46, and a secondary conveyor 47 adjacent the exit end of the machine and below the main conveyor. Both conveyors are driven intermittently together and in synchronism under electrical control indicated in FIG. 12 and described below. Each link 46 includes two cavities 48 side by side as shown in FIG. 2, the links forming supports for the package trays formed from the bottom film. Each link includes a port 49 (FIG. 2 and 4) leading from each cavity for vacuum forming purposes, and a center hole 50 for receiving a notching means referred to below, and for evacuating and purging purposes. The film from the roll 42 is threaded or fed into position over the conveyor at the entry end, lying across the open faces of the cavities in the conveyor links, the film extending substantially the width of the conveyor.

The film from the roll 42 is then fed through the heating station, and for this purpose a heater means 51 is provided which preferably includes a cover or box 52 (FIG. 3) positioned immediately above the conveyor and over the film. A relatively large number of radiant heating elements 53 are mounted in the cover and they extend substantially across the film for heating the film for the vacuum forming step. This cover 52 may be hinged for convenience as represented in FIG. 3 to expose the film thereunder, as well as the heating elements.

The electrical control for the film heater 51 is indicated in the circuit diagram of FIG. 12. An electrical source is indicated by the main lines 54, and interconnecting the line 54 is a line 55 including a heat controlled switch 56 including a thermistor 57 which is placed in the heating means 51 at an appropriate point. The thermistor and the circuit are set so that upon the effective temperature dropping to a certain minimum, the switch 56 is closed, and of course upon reaching a certan maximum temperature, the switch is opened. The heating means is also controlled in the normal cyclic operation by a time delay relay means 58 having a coil 58a and contacts 58b. The relay is controlled by the main conveyor 45 in a known manner; the relay also includes additional contacts 58c which are utilized in controlling the drive of the variable speed motor 59 utilized for driving the conveyor. The arrangement of the time relay 58 is such that the conveyor can be driven at any desired speed, but it is so driven intermittently, and the relay enables the conveyor to be driven at any desired speed, within a predetermined range, but the period of dwell is the same regardless of the speed of the conveyor, whereby to enable the necessary steps to be taken in the dwell, including loading, sealing, evacuating, and the necessary time for the heater means to heat the bottom film sufficiently.

A vacuum forming step is then performed as indicated by the vacuum lines 59a (FIG. 1). This vacuum forming step in itself may be conventional and the lines may extend beyond the heater means 51, as indicated in FIG. 1. When the conveyor is stationary, as described below, the vacuum lines 59a communicate with the ports 49 and at that time the vacuum forming step is performed. The film retains its heat beyond the heater means and the forming step may be performed partially beyond the heater means, as well as within the heater means. These heating elements are distributed over a substantial length of the film and the heat is applied continuously, rather than in on-off fashion, and it is further pointed out that because of the great linear length over which the elements are distributed, the film is heated gradually and substantially uniformly throughout its thickness.

The apparatus includes means for evacuating and purging the interior of the package, and for this purpose the bottom tray of th package is perforated. FIG. 4 shows a formed plastic bottom tray 60 having two cavities 61, as formed in the cavities 48 in the links of the conveyor. The tray has a flat planar perimeter strip 62 generally surrounding the cavities, and a center strip 63 in which is an aperture 64 formed by notching or punching out a curved strip 65. This aperture is utilized in the evacuating and purging step which follows along later in the machine and as described below. The notching operation to form this aperture takes place adjacent the heater means 51, such as immediately anterior thereto as indicated by the reference numeral 66 in FIGS. 1 and 3. At that position a cross support 68 is provided (FIG. 5) for mounting a notcher member 70 mounted in a suitable manner as by pivoting it at 72, and as the film 42 passes at this position, the notcher 70 is actuated, being so actuated in synchronism with the conveyor. The notcher 70 has a cuter element 74 which cuts the film and forms the aperture 64 and the curved strip 65 thereabove, at such position that the aperture and strip 65 will be at the center point of the tray 60 as that tray is later formed, the film being at this time continuous.

Figure 7:
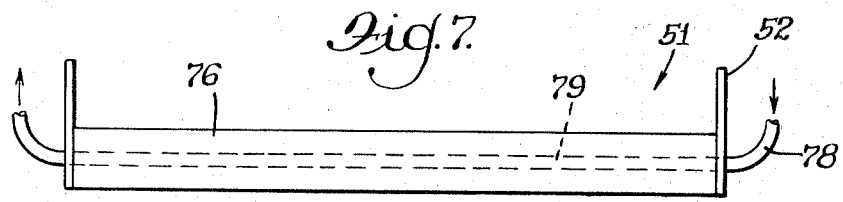
FIG. 7 is a fragmentary detail view of a cooling element incorporated in the main film heater means.

Due to the ralatively great heat provided by the heating means 51, means is provided to retain the center strip 63 of the tray relatively cool so that the curved strip 65 will maintain its preformed condition and raised position in the evacuating and purging step. This is accomplished by providing a center bar 76 (FIG. 3 and 7) in the heater means cover, positioned so that when the cover is moved down to closed position, that bar will overlie the center strip 63 in the tray. A cooling medium, such as water, is introduced through a tube 78 and it passes through a bore 79 in the bar 76. This bar shields the center strip 63 from the direct heating effect of the heating elements, and provides additional cooling by the cooling medium or water.

As the next step in the packaging operation, the articles to be packaged, such as slices of meat, are introduced into the cavities 61 of the trays at the loading station 34 by any suitable means. This may be done manually or by a suitable automated operation.

Figure 9:
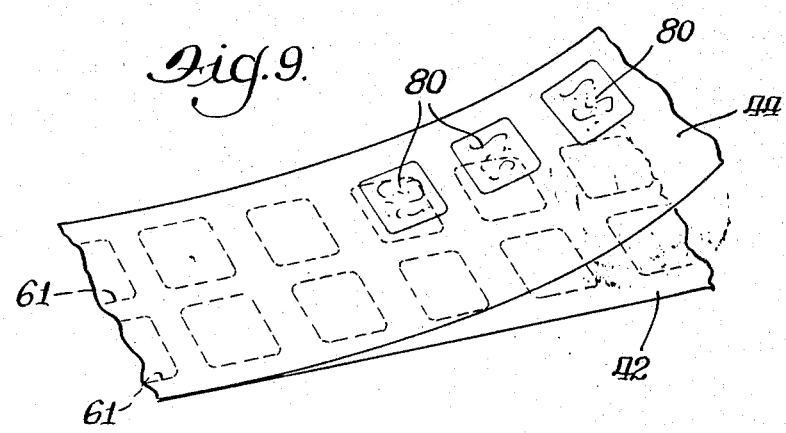
FIG. 9 is a diagrammatic perspective representation of the two films being superimposed preparatory to sealing them.
Figure 10:
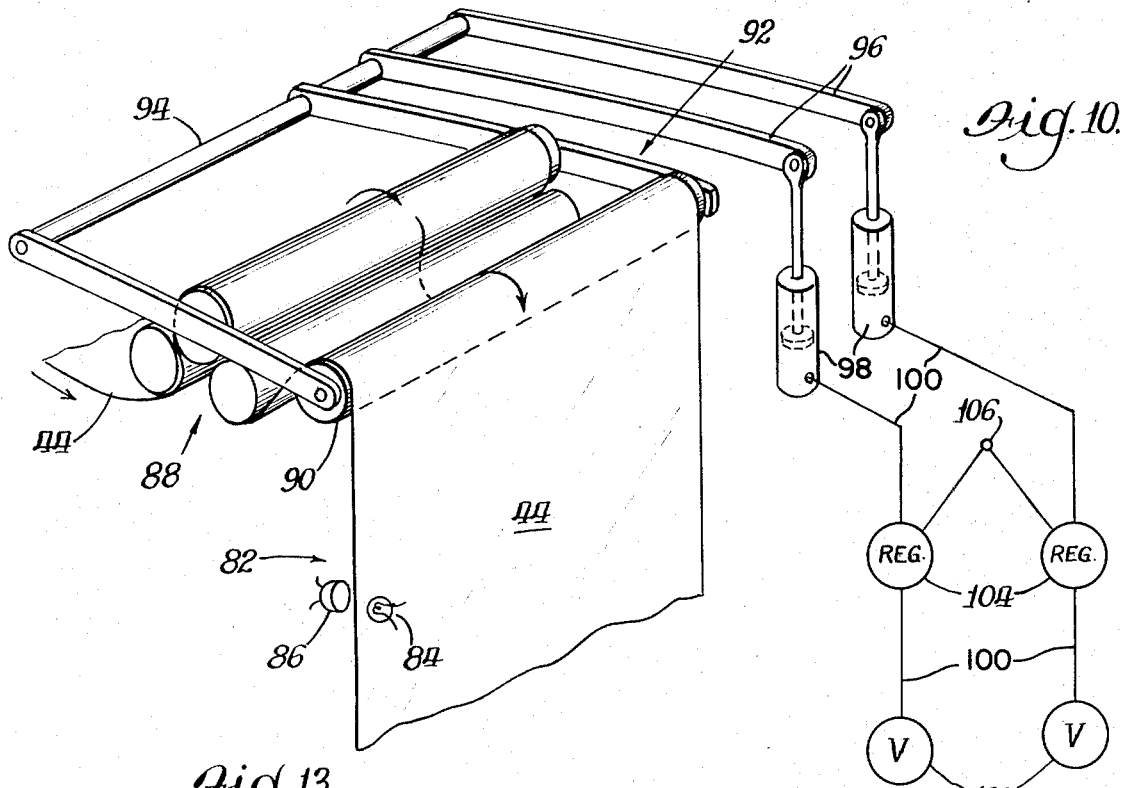
FIG. 10 is a perspective representation, semi-diagrammatic in nature, of the tensioning means for controlling registration of the films.

Following the loading step, the conveyor progresses to the registration station 36 and immediately thereafter the evacuating and sealing station 38. As the conveyor proceeds toward the station 36, the lid film 44 (FIG. 8) is fed into position overlying the plastic trays then containing the articles being packaged, and the two films together fed into that station. FIG. 8 shows a portion of the machine at this station, where the trays 60 are shown on the conveyor and the top film 44 is moving down, this top film then being fed or threaded along with the trays, again as represented in FIG. 1. FIG. 9 is a diagrammatic illustration of the top film 44 being laid in position over the trays. The top film is provided with label patterns 80 which of course are to be brought into registration with the cavities in the trays. FIG. 8 shows a PE cell unit 82 adjacent the down run of the top film, (see also FIG. 10), the unit including a bulb 84 and a cell 86, on opposite sides of the film, the beam therebetween being affected by relative transparency conditions in the film. The complete circuit is shown in FIG. 11. As noted above, the registration is effected through tension control of the top film, and this is in turn produced by the arrangement shown diagrammatically in FIG. 10. The top film 44 proceeds (FIG. 10) through a roller system 88 which includes an individual rollr 90 mounted in a support 92 pivoted on an axis member 94 and swingable vertically by means of arms 96 actuated by air cylinders 98. Air lines 100 lead from valves 102 through regulators 104 and communicate with the air cylinders. The regulators 104 are controlled by the PE cell unit 82, see the circuit of FIG. 11, and further controlled in synchronism with the travel of the conveyor and trays through a valve control means indicated diagrammatically at 106. Under such control, if the top film should be advancing too fast relative to the trays in the bottom film, the regulators 104 will further open the valves 102 to admit increased pressure to the air cylinders 98, in response to which the latter will be extended, raising the roller 90 and increasing the tension on the top film. This increased tension slows down the speed of the film. In addition, the film possesses a degree of stretchability, and the label patterns are then effectively spaced farther apart to be brought into registration with the trays. If the opposite situation exists, namely that the top film is proceeding too slowly, the air pressure in the air cylinders is decreased, enabling the roller 90 to be lowered, resulting in less tension on the top film.

It is believed that the operation of the electrical circuit of FIG. 11 will be understood in view of the foregoing description of the operation. FIG. 11 includes the bulb 84 and PE cell 86 and the advancing and retarding components 102-104. The circuit also includes a PE signal amplifier 108, an input signal potentiometer 110, and a photo-cell signal ammeter 112.

Figure 13:
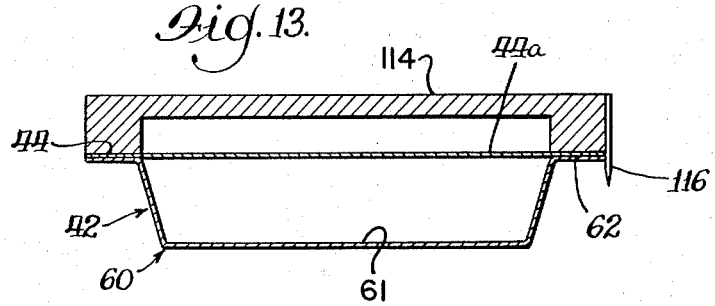
FIG. 13 is a semi-diagrammatic detail view showing sealing of the films.

After effecting registration of the top film with the trays the first sealing step between the top film and the trays is performed. This sealing operation is a well known type and is represented in FIG. 13 and includes a top hot plate 114. This plate seals the two film portions together only around the periphery (FIG. 4), i.e., around the planar strip or edge elements 62, and not across the center strip 63. This plate may also include a cutter element 116 for cutting the trays apart in conjunction with this sealing step.

Figure 14:
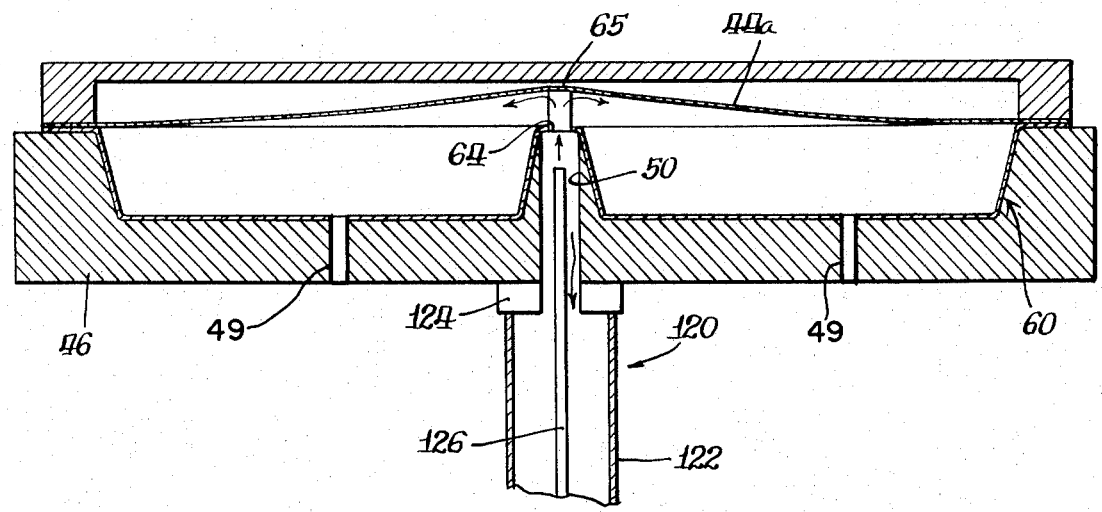
FIG. 14 is a sectional view showing the main elements in the evacuation and main sealing operation.

The resulting is a semi-completed package, and may be refered to as a package unit, shown in FIG. 14, which includes the plastic tray 60, and the severed piece 44a of the top film 44 sealed thereto around the periphery, this figure also showing the conveyor link 46, which of course provides a support for the package unit. The curved strip 65 (FIG. 4) which was formed in the perforating step also is shown in FIG. 14, and it will be noted that it is in elevated position, maintaining its preformed shape. This strip 65 therefore holds the center portion of the top film element 44a in elevated position, exposing the aperture 64 which is in register with the center hole 50 in the conveyor link or support. The evacuating and purging step is then performed, the device for this purpose including a valve means 120 with an outer tube 122 on which is a valve head 124, and an inner tube 126 which extends through and upwardly of the valve head and leads into the hole 50. Nitrogen is introduced through the inner tube 126 and it flows into the interior of the semifinished package, or package unit, at the center, flowing under the top film, or lid, 44a and spreading laterally into the cavities of the package unit or semi-finished package. The air previously therein is expelled from the cavities, being pushed downwardly and inwardly and then in return through the hole 50 and the outer tube 122.

After the evacuation and purging step just described, the second sealing step is performed which preferably is done at a succeeding position, namely the conveyor and package units are advanced the length of a package unit. This is done at approximately the position indicated at 128 (FIGS. 1 and 16). The second sealing means also may be of desired detail construction, and may include a means shown semi-diagrammatically in FIG. 15. This latter deivce may include what is known as a cold plate, but having a center hot seal element 130 that engages the lid or top film element 44a and seals it with the center strip 63 of the tray. The resulting product referred to above as a package unit, is a double package, and it is later trimmed and separated into separate and individual packages as described hereinbelow.

After the second sealing step the package units are carried by the main conveyor 45 beyond the station 38 and downwardly at the return end of the conveyor, the package units remaining in the conveyor by friction, or by bails 132 (FIGS. 1 and 16).

When the package units reach the bottom run of the conveyor, they are removed by a suction grip means 134 (FIG. 1) which is mounted on vertically swingable arms 136 and includes a suction pipe 138. The grip means is associated with the secondary conveyor 47 (see also FIGS. 16 and 17) which has spaced endless belt elements 139. The arms and the suction pipe may operate between the belt elements and is moved up to suction-grip the package unit from the main conveyor and bring it down onto the conveyor 47.

The lower secondary conveyor 47 has an extension 140 (shown in FIGS. 17-19 but not in FIG. 1) which may be effectively a part of the same conveyor. The conveyor 47-140 carries the package units to a trim die 142 having a base plate 144 forming an anvil, and a vertically reciprocable cutter head 146. This trim die trims the package unit around its periphery, in a final trimming operation, being synchronized with the movement of the conveyor means and other operating functions.

Figure 17:
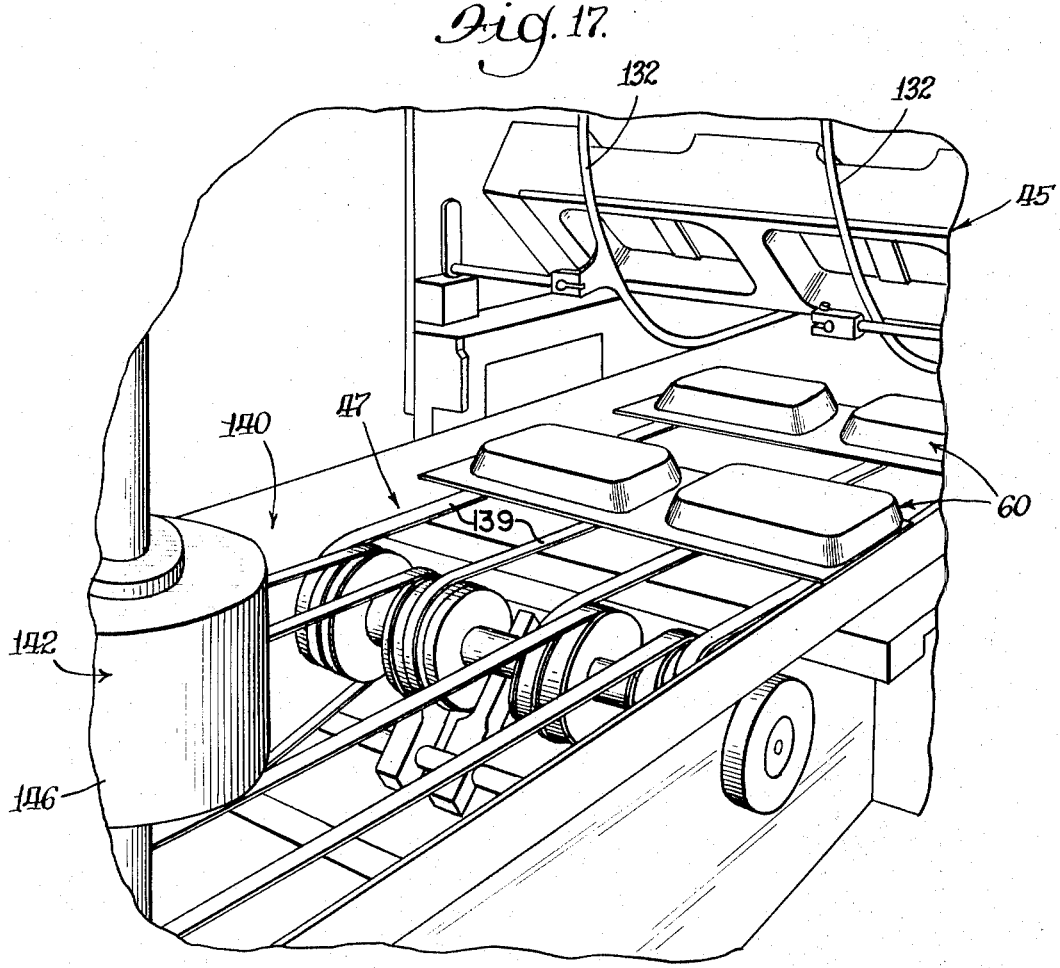
FIG. 17 is a perspective view showing certain of the elements of FIG. 16 and additional elements.

The machine also includes novel means for guiding the package units for the trimming and final cutting steps. Attention is directed to FIGS. 17, 18, 19 which show the package units on the lower or secondary conveyor 47-140 and in such condition they are sometimes subject to being misaligned, whereas when they are in the cavities in the main conveyor, they remain in proper position. These figures which also show the trim die 142, include stop means 145 which includes a finger 147, preferably a pair of such fingers spaced transversely of the conveyor, and extending upwardly through the spaced belt elements therein. These fingers are mounted on or form extensions of arms 148 pivoted at 150 and when in raised position they provide stop means for engagement by the package units. These fingers or stop means are synchronized with movement of the conveyors, and the trim die, so that if the package units should be ahead of the proper position, or be misaligned, they will engage the fingers and be held while the conveyor may continue to move thereunder. At the proper moment of synchronism the fingers are moved downwardly by suitable operating means and permit the package units to proceed on the conveyor.

Figure 20:
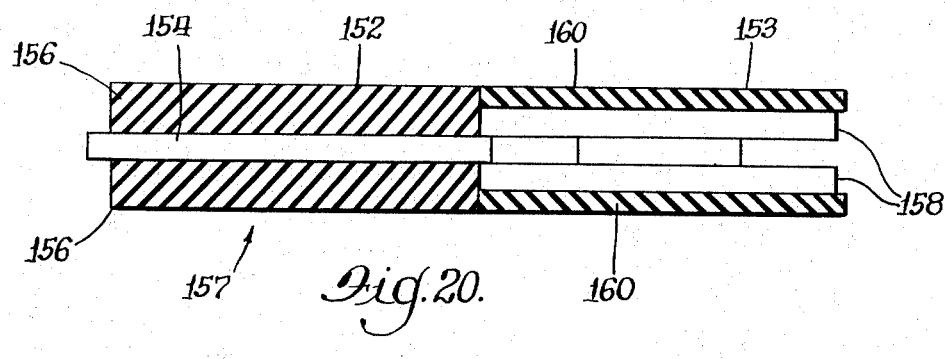
FIG. 20 is a detail sectional view of the final cutter means for separating the package units into individual packages.

The conveyor 140 continues to carry the package units rearwardly and they are brought under a final cutter means 157 shown in FIG. 18 and shown in section in FIG. 20, this cutter means including upper and lower rotary wheels 152, 153, respectively. The upper wheel includes a center steel cutter disc 154 and two side discs 156 of high friction coefficient and of smaller diameter than the steel disc. The lower wheel includes a pair of axially spaced steel cutter discs 158 overlapping the steel disc 154 and engaging the side surfaces thereof and a pair of side gripper discs 160 also of high friction coefficient, engaging the discs 156. This cutter means is centered relative the package units as they proceed along the conveyor, and as the gripper discs grip the package units, they pull it through the cutter means, while the steel discs 154, 158 cut away the center strip of the package unit, forming the final two packages.

I claim:

1. In a packaging machine for forming packages from opposed films of material, a first of the films being preformable and capable of retaining a preformed shape, the combination comprising,
    b. the machine having a plurality of stations and including a conveyor for conveying said first film through the machine, successively through the stations, and determining anterior and posterior positions relative to the direction of movement of the conveyor,
    c. means at a first of the stations for heating the first film including a box over the conveyor and the film thereon and including a plurality of heating elements over and exposed to the film for radiantly heating it, the heating elemetns extending transversely the full width of the film and being of great number and distributed longitudinally along the film a substantial distance, and being operative for substantially uniformly heating the film throughout the area over which the heating elements are psitioned and throughout the thickness of the film in that area,
    d. the conveyor including links having cavities for receiving overlying portions of the film, and also having ports communicating with the cavities for connection with vacuum lines,
    e. vacuum lines adjacent the posterior end of the first station and communicating with said ports when the respective conveyor links are in register therewith, for connection with means acting through those lines and ports for producing a vacuum in said cavities, to form corresponding cavities in said first film,
    f. means posterior to (e) for placing a lid film over the first film on the conveyor,
    g. means posterior to (f) for sealing the two films, and
    h. means posterior to (g) for cutting the sealed films into separate package units and packages.

2. A combination according to claim 1 wherein the vacuum lines are a plurality in number spaced longitudinally along the conveyor, and operative for simultaneously communicating with a corresponding plurality of ports and cavities in the conveyor.

3. A combination according to claim 2 wherein the vacuum lines are distributed longitudinally along a length of the conveyor which includes a portion under the box of heating elements and posterior therebeyond, whereby an evacuating step can be performed while certain of the cavities in the conveyor are under the heating elements and others in an area posterior to the heating elements.

4. A combination according to claim 1 wherein the heating means is operative applying heat to the film continuously as contrasted to on-off steps, and the heating means thereby is operative for heating the film effectively uniformly throughout the area thereof over which the heating means is disposed, and also uniformly throughout the thickness of the film in that area.

5. A combination according to claim 4 wherein the heating means is operative for applying heat continuously to the film at temperatures above a predetermined minimum, and
    the combination includes sensing means responsive to the gemperature of the film at the station where the film is being heated for controlling the heating means to maintain predetermined temperature at that location.

6. A combination according to claim 1 and including means for moving the conveyor intermittently in steps, and the heating elements are operative for applying heat to the first film both during periods of movement of the conveyor and during periods of non-movement thereof.

7. A combination according to claim 6 wherein the heating means is operative for heating the first film continuously as contrasted to on-off steps, and is correspondingly operative for heating the film during both the periods of movement and periods of non-movement of the film.

8. A combination according to claim 1 wherein the box of the heating means has an interior space opening downwardly, the heating elements are in that interior space, and the box effectively encloses the space immediately above the film and nearly and effectively encloses the corresponding portion of the film itself.

9. A combination according to claim 1 in which the conveyor includes, in each link, transversely spaced cavities for forming correspondingly positioned cavities in the film on the conveyor, with a center strip therebetween, and
    the combination also includes a notcher for forming apertures in the film in said center strip at points spaced longitudinally therealong corresponding with and in register with the cavities in the conveyor links.

10. A combination according to claim 9 wherein the heating means includes a longitudinally extending center bar that is cooled relative to the heating elements and is operative for maintaining said center strip of the film in cooled and relatively non-pliable condition.

11. A combination according to claim 10 wherein the notcher in forming an aperture is operative for leaving an arcuate strip over the aperture wich because of the relatively cooled condition of the center strip remains in preformed position, and is operative for normally retaining the upper film in spaced relation to the aperture whereby to facilitate passage of purging gases therethrough into the cavities in the film.

12. A combination according to claim 11 wherein the cavities formed in the first film are depressed from the plane of the main portion of the film before formation of the cavities, leaving a perimeter portion and said center strip in each package unit, which lie in a common plane at the top of the cavities, and the aperture in said center strip is thereby at the top of the cavities.

13. A combination according to claim 12 and including first sealing means operative for sealing the portions of the two tilms in each package unit around the perimeter thereof to the exclusion of the center strip portion thereof, the upper film then overlies and covers the apertures in the first film, and second sealing means foresealing the two films along said center strip portion to form individually sealed cavities in the package unit.

14. A combination according to claim 9 and including first cutting means operative for cutting the two sealed films transversely forming a series of longitudinally spaced padkage units each of which includes a pair of transversely spaced cavities, and second cutting means operative for cutting the package units longitudinally forming a pair of packages from each package unit.

15. A combination according to claim 14 wherein the second cutting means is operative for cutting out and removing the center strip portion of each package unit.

* * * * *